United States Patent [19]

Kenney

[11] 3,943,795
[45] Mar. 16, 1976

[54] AUXILIARY AUTOMOBILE BRAKE OPERATOR FOR ACTUATION BY FRONT SEAT PASSENGER

[75] Inventor: Frank T. Kenney, Fort Lauderdale, Fla.

[73] Assignee: Collete Love, Fort Lauderdale, Fla.

[22] Filed: Apr. 14, 1975

[21] Appl. No.: 567,502

[52] U.S. Cl. .................... 74/562.5; 74/479; 74/560
[51] Int. Cl.² ......................................... G05G 1/16
[58] Field of Search .......... 74/562.5, 512, 560, 479, 74/480 R

[56] References Cited
UNITED STATES PATENTS 2,166,978  7/1939  Stack ................................ 74/562.5
2,710,547  6/1955  Davenport ........................ 74/562.5

Primary Examiner—Samuel Scott
Assistant Examiner—F. D. Shoemaker
Attorney, Agent, or Firm—Oltman and Flynn

[57] ABSTRACT

A floor-mounted bracket at the passenger's side of the front seat rotatably supports a rigid linkage rod, which extends laterally over to the driver's brake pedal. An auxiliary brake pedal is adjustably attached to this rod for rotating the rod in a direction to apply the vehicle brakes when the auxiliary foot pedal is depressed.

3 Claims, 5 Drawing Figures

U.S. Patent   March 16, 1976   3,943,795
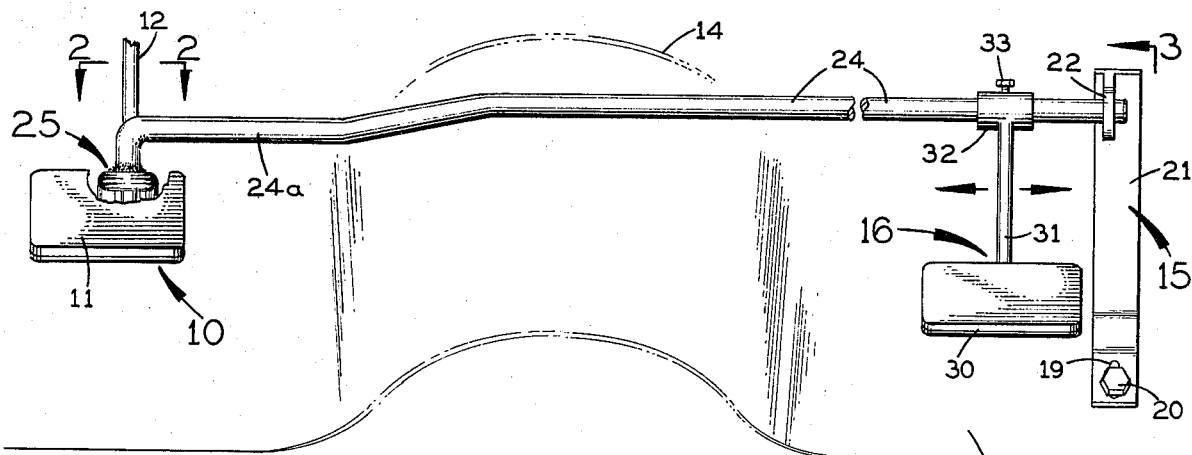
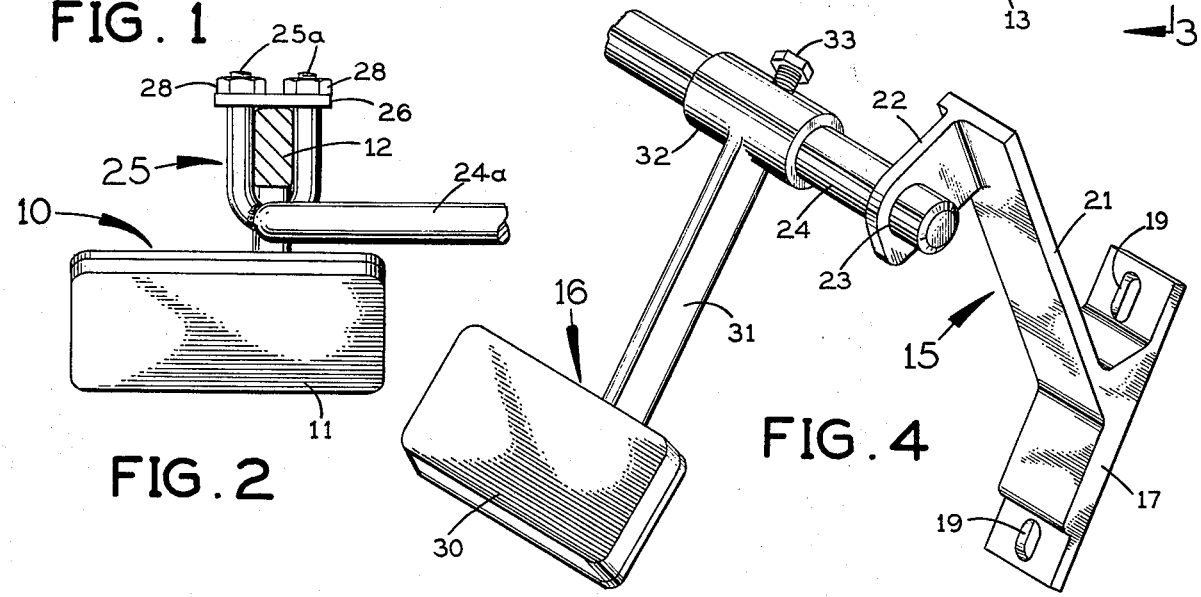
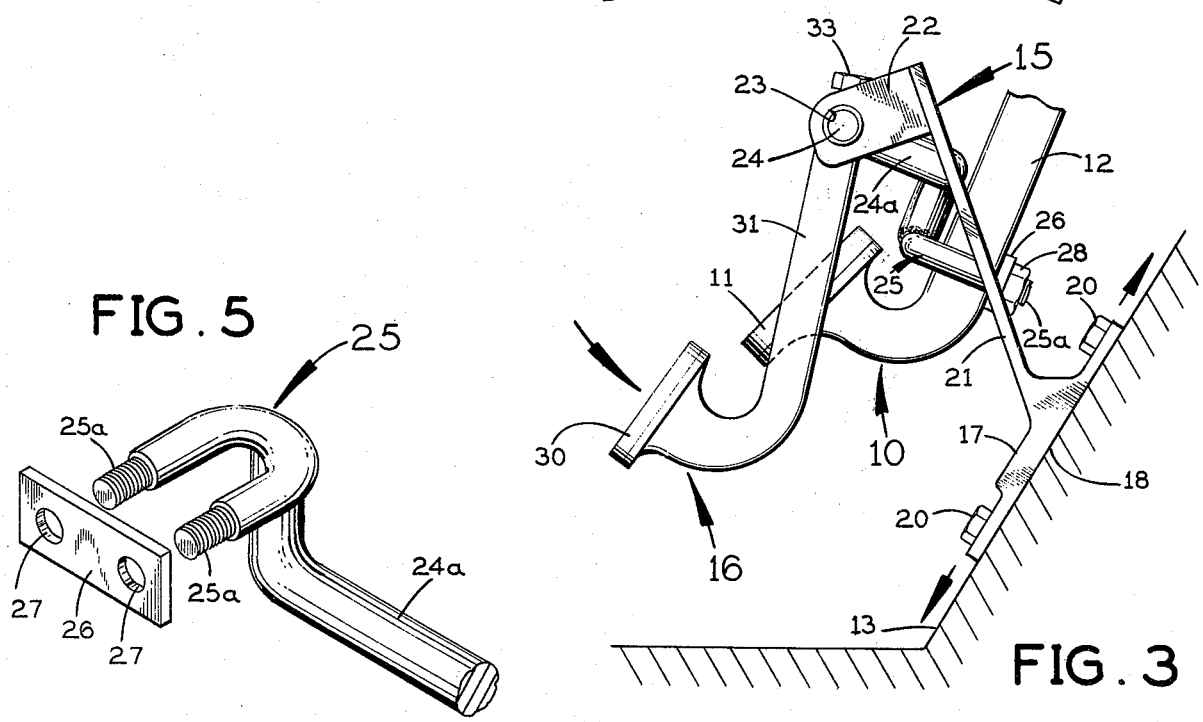

AUXILIARY AUTOMOBILE BRAKE OPERATOR FOR ACTUATION BY FRONT SEAT PASSENGER

BACKGROUND OF THE INVENTION

Various proposals have been made heretofore for auxiliary brake controls on automobiles to enable a driving instructor sitting in the passenger's side of the front seat to apply the brakes of an automobile operated by a student driver. Such prior proposals have not been entirely satisfactory because of various factors, including the undue complexity of the linkage between the auxiliary brake pedal and the driver's brake pedal, the unsatisfactory manner in which the auxiliary brake pedal and this linkage are supported physically, the lack of ready adjustability to suit the preferences of individual driving instructors, and the obstruction of the feet and legs of the driving instructor. Examples of such proposals for this general purpose are disclosed in the following U.S. patents: Nafe et al U.S. Pat. No. 2,647,414; Berman U.S. Pat. No. 2,677,976; Holum U.S. Pat. No. 2,720,121; Garver U.S. Pat. No. 2,814,212; Rose U.S. Pat. No. 3,174,359; and Allgaier U.S. Pat. No. 3,435,703.

SUMMARY OF THE INVENTION

The present invention is directed to a novel and improved auxiliary brake operator for actuation from the passenger's side of the front seat which is of rugged and simplified construction and is eminently practical for use in driver training automobiles. It has a floor-mounted support bracket at the passenger's side of the front seat which is readily adjustable to different positions for the comfort and convenience of each individual driving instructor. A rigid linkage rod is rotatably supported by this bracket and it extends laterally over to the driver's brake pedal. The auxiliary brake pedal (for operation by the driving instructor) is slidably adjustable on this linkage rod.

The principal object of this invention is to provide a novel auxiliary brake operator for an automobile to enable the vehicle brakes to be operated by a driving instructor on the passenger's side of the front seat.

Further objects and advantages of this invention will be apparent from the following detailed description of a presently-preferred embodiment thereof, which is shown in the accompanying drawings, in which:

FIG. 1 is a top plan view of the present invention connected to the driver's brake pedal in an automobile;

FIG. 2 is a vertical longitudinal section taken along the line 2—2 in FIG. 1 and showing the attachment of the present auxiliary brake operator to the driver's brake pedal unit;

FIG. 3 is a view taken vertically along the line 3—3 in FIG. 1 and showing in end elevation the mounting bracket and the auxiliary brake pedal unit of the present brake operator, as well as the driver's brake pedal unit on the other side of the car;

FIG. 4 is a fragmentary perspective view showing the mounting bracket, the auxiliary brake pedal unit, and the linkage rod at the passenger's side; and FIG. 5 is an exploded perspective view of the clamp assembly for attaching the linkage rod to the driver's brake pedal unit.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

In the following description, the terms of direction, "front" and "rear", are used with reference to the front and rear of the automobile itself.

Referring first to FIG. 1, the present brake operator is intended for use on an automobile of standard design having the usual brake pedal unit 10 at the driver's side in front. This driver's brake pedal unit has a foot pedal 11 attached to the lower end of a downwardly and rearwardly inclined rigid arm 12 whose upper end is pivotally supported. When the foot pedal is depressed, the arm 12 pivots counterclockwise in FIG. 3 and causes the brakes to be applied in a well-known manner which forms no part of the present invention and hence need not be disclosed in detail.

As shown in FIG. 3, the vehicle has a floor in the front seat compartment which includes an upwardly and forwardly inclined flat floorboard 13, also of known design, on the front seat passenger's side of the usual transmission hump 14 (FIG. 1).

In accordance with the present invention, a bracket 15 is adjustably mounted on this inclined floorboard to support an auxiliary brake pedal unit 16, which is coupled to the driver's brake pedal unit 10, in a manner to be described, such that the vehicle brakes can be applied by the front seat passenger.

The bracket 15 has a base 17 with a flat bottom face 18 for direct engagement with the inclined floorboard 13, as shown in FIG. 3 from which it will be evident that this base extends parallel to this inclined floorboard. The base 17 has a pair of elongated slots 19 (FIG. 4) near its opposite ends, and these slots pass respective mounting screws 20 (FIG. 3) which are threaded into the inclined floorboard 13. The elongation of these slots permits the bracket base to be adjuted up or down along the inclined floorboard 13 after screws 20 have been loosened.

The mounting bracket 15 has an upstanding rigid post 21, which is inclined rearward and upward from the base 17 of the bracket when the latter is mounted on the inclined floorboard 13, as shown in FIG. 3. At its upper end the bracket has a rearwardly and downwardly extending segment 22 attached to the upper end of the post 21. This segmemnt has a circular opening 23, which is spaced rearward from the upper end of post 21.

A rigid linkage rod 24 of circular cross section has its right end rotatably received in the bracket opening 23. This rod extends laterally (to the left) from the bracket 15 over to a location directly in front of the foot pedal 11 of the driver's brake pedal unit 10. The linkage rod 24 extends generally horizontal, but if necessary it may be bent to pass freely over the transmission hump 14 in the floor. The left end 24a of this linkage rod, which is in front of the driver's brake pedal unit 10, is offset downwardly from the rotatably mounted right end of this rod.

As best seen in FIG. 5, the left end 24a of the rod carries a forwardly-projecting, generally U-shaped member 25 which snugly straddles the arm 12 of the driver's brake pedal unit 10, as best seen in FIG. 2. A flat plate 26 extends across the front edge of this arm 12, as shown in FIGS. 2 and 3. This plate has a pair of openings 27 (FIG. 5) for passing the screw-threaded ends 25a of the opposite legs of the U-shaped member 25. A pair of nuts 28 (FIG. 2) are threaded onto these ends of the U-shaped member, and they clamp the U-shaped member and the plate 26 tightly on the arm 12 of the driver's brake pedal unit 10 in the manner shown in FIG. 2.

With this arrangement, the linkage rod 24 is rigidly coupled to the driver's brake pedal unit 10 so that when the rod is rotated counterclockwise in FIGS. 3 and 4 this causes the driver's brake pedal unit 10 to move counterclockwise in FIG. 3 enough to apply the vehicle brake. Such rotation of the rod 24 can be effected by actuating the auxiliary brake pedal unit 16, located at the passenger's side of the front seat.

As shown in FIG. 4, this auxiliary brake pedal unit has a foot pedal 30 at its lower end, a rigid shank 31 extending upward and forward from this foot pedal, and a sleeve 32 attached to the upper end of this shank and slidably passing the linkage rod 24. A set screw 33 is threadedly mounted in an opening in this sleeve and is engageable with the linkage rod 24 to lock the sleeve 32 to the rod. When this set screw is loosened, the auxiliary brake pedal unit 16 may be adjusted laterally by sliding the sleeve 32 along the rod 24 to whatever position is most comfortable for the front seat passenger.

With this arrangement, with the set screw 33 tightened the auxiliary brake pedal unit 16 at the passenger's side is rigidly coupled to the linkage rod 24 so that the depression of the foot pedal 30 of this unit will cause a corresponding rotation of the rod 24 for applying the vehicle brake.

I claim:

1. In an auxiliary brake operator for acutation from the passenger's side of the front seat of an automotive vehicle which has brakes and a driver's brake pedal unit for operating the brakes, said auxiliary operator having:

a bracket for attachment to the floor of the vehicle on the passenger's side;

a rigid linkage rod rotatably supported by said bracket and extending from the bracket laterally over in front of the driver's brake pedal unit and clamped to the driver's brake pedal unit;

and an auxiliary brake pedal unit on the passenger's side for rotating the linkage rod in a brake-applying direction when the auxiliary brake pedal is depressed;

the improvement wherein:

said bracket has an upwardly and forwardly inclined base for direct engagement with the inclined floorboard of the vehicle below the dashboard, said base having slots therein which are elongated longitudinally of the base for adjustment of the bracket position with respect to mounting bolts which extend down through said slots and into the inclined floorboard.

2. An auxiliary brake operator according to claim 1, wherein said bracket has an upstanding post which is inclined rearward and upward from said base and carries said rigid rod at its upper end.

3. An auxiliary brake operator according to claim 1, wherein said auxiliary pedal unit has a sleeve at its upper end which is slidable along said linkage rod to adjust the lateral position of the auxiliary pedal unit, and a set screw on said sleeve for selectively locking it to said linkage rod.

* * * * *